J. S. BALDOCK.
POWER TRANSMISSION.
APPLICATION FILED MAY 21, 1917.
1,308,614.
Patented July 1, 1919.
2 SHEETS—SHEET 1.
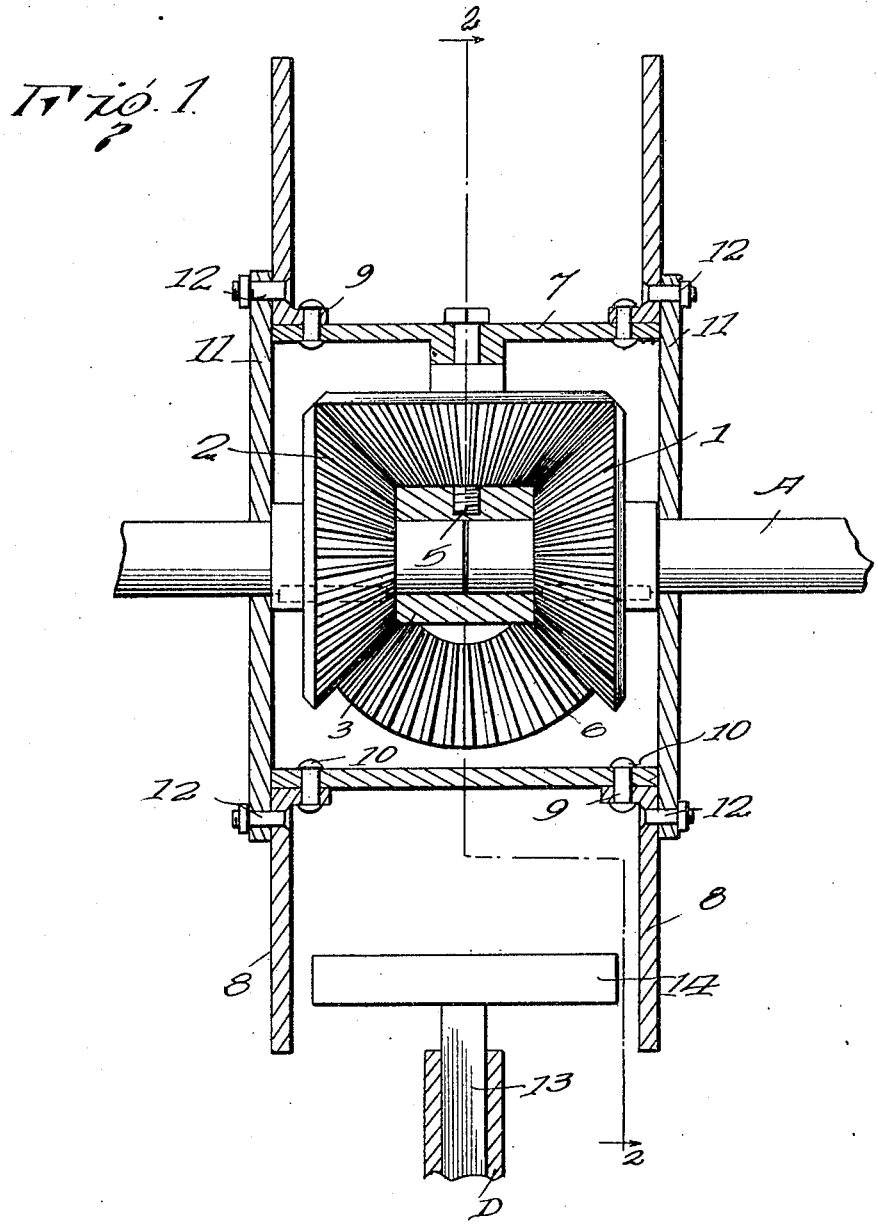
John S. Baldock
Inventor
By Geo. P. Kimmel
Attorney J. S. BALDOCK.
POWER TRANSMISSION.
APPLICATION FILED MAY 21, 1917.
1,308,614.
Patented July 1, 1919.
2 SHEETS—SHEET 2.
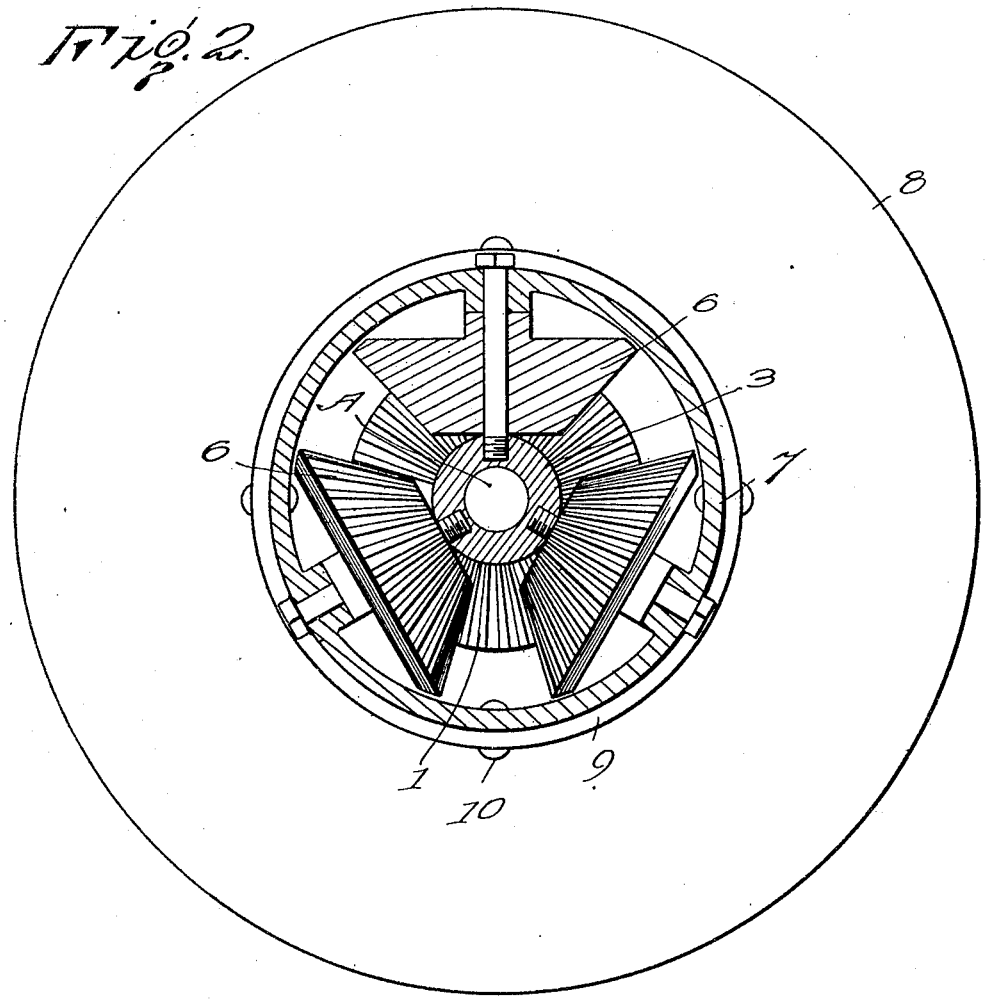
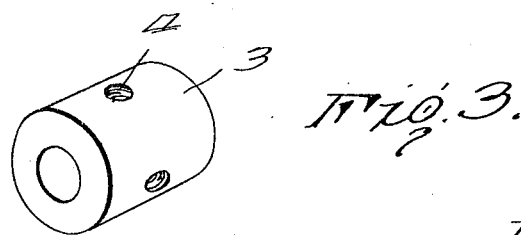
John S. Baldock
Inventor
By Geo. P. Kimmel
Attorney

UNITED STATES PATENT OFFICE.

JOHN S. BALDOCK, OF CLAYTON, INDIANA.

POWER TRANSMISSION.

1,308,614.  Specification of Letters Patent.  Patented July 1, 1919.

Application filed May 21, 1917. Serial No. 169,982.

*To all whom it may concern:*

Be it known that I, JOHN S. BALDOCK, a citizen of the United States, and resident of Clayton, in the county of Hendricks and State of Indiana, have invented certain new and useful Improvements in Power Transmission, of which the following is a specification.

This invention relates to power transmitting mechanism for motor driven vehicles and it is the dominant object of the invention to provide a variable speed gearing whereby a plurality of different driving relations or speed ratios may be attained by the use thereof; the device eliminating the use of the present day variable speed transmission mechanism involving intricate gear shifts before the desired speed ratio can be established, and providing a much more simplified and compact structure in lieu thereof.

Another object of the invention is to provide a novel form of casing for the transmission, the periphery of which is provided with a plurality of friction disks intergeared with and adapted to be driven by means of the ordinary power shaft.

Other independent objects are to provide features of construction of portions of the transmission which tend toward the attainment of the above aims irrespective of the relation in which they are used.

Other objects will be in part obvious and in part pointed out hereinafter.

The invention accordingly consists in the features of construction, combination of elements and arrangement of parts which will be exemplified in the construction hereinafter set forth, and the scope of the application of which will be indicated in the following claim.

In the accompanying drawings, wherein is shown one of various possible embodiments of my invention.

Figure 1 is a horizontal section therethrough;

Fig. 2 is a section taken on the line 2—2 of Fig. 1 looking in the direction in which the arrow points; and Fig. 3 is a detail in perspective of the gear supporting hub for the differential drive.

Similar characters of reference designate similar parts throughout the several views of the drawings.

Having more specific reference to the drawings, A indicates the driving axle of the vehicle which, obviously, is formed in sections and has mounted upon its adjacent ends beveled gears 1 and 2. Over the extended portions of the adjacent ends of the sectional drive axle A a hollow cylindrical hub 3 is arranged and is provided with a plurality of screw threaded pockets 4 into which the threaded stub shafts 5 which support annularly disposed bevel gears 6 are turned. As will be noted, the annularly disposed bevel gears 6 constantly mesh with the gears 1 and 2 mounted on the adjacent ends of the drive axle sections.

A circular casing or drum 7 is arranged about the gearing and, as shown in the Fig. 1, is connected to the outer ends of the stub shafts 5 of the beveled gears 6. Upon the periphery of the casing and adjacent the marginal edges thereof friction disks 8 are arranged and are secured to the same by forming flanges 9 thereon and passing rivets or other suitable connections 10 through the same and the adjacent portions of the said casing. To close the opposite sides of the casing 7 other disks 11 are arranged over the sections of the drive axle A and are secured to the adjacent edges of the disks 8 as at 12, thereby providing an efficient housing or casing for the lubricants for the meshing bevel gears arranged within the casing 7.

A portion of the drive shaft is represented at D and is formed hollow and slidably receives therein a squared stub shaft 13 carrying a friction gear 14 upon its outer or free end. In this connection, it is to be noted that the drive shaft is capable of lateral movement whereby the friction gear 14 may be moved into engagement with either of the faces of the friction disks 8 by operating suitable shifting mechanism, not shown. Hence, by moving the gear 14 into engagement with one of the friction disks 8 a forward drive will be imparted to the sectional axle A and should the gear 14 be then shifted out of engagement therewith into engagement with the other friction disk the drive to the axle would be reversed. Other means, not shown, are provided whereby the gear 14 may be moved over the faces of the friction disks 8, toward or from their respective centers in order that the velocity thereof may be varied, thereby permitting the establishing of different driving relation or speed ratios.

When operating the improved device rotary motion is imparted by way of the friction gear 14 to either of the friction disks 8 and thence by way of the casing 7 to the bevel gears 6, these gears serving as keys or connecting elements between the casing and the gears 1 and 2 carried upon the adjacent ends of the axle section A. Thus either element of the sectional axle will be driven.

Manifestly, the construction shown is capable of considerable modification and such modification as is within the scope of my claim, I consider within the spirit of my invention.

I claim:

In a device of the class described, a drum having a plurality of inwardly directed bearings and outwardly directed annular members in spaced relation, said annular members having frictional confronting faces, closures for the ends of the drum and each having a shaft bearing, a two member axle mounted respectively in the bearings of the closure, a bevel gear carried by each of said axle members, a bevel gear associated with each of said drum bearings and meshing with the bevel gears of the axle members, and a frictional gear operating between the annular friction faced members and adapted to be engaged alternately therewith.

In testimony whereof, I affix my signature hereto.

JOHN S. BALDOCK.

Copies of this patent may be obtained for five cents each, by addressing the "Commissioner of Patents, Washington, D. C."